(12) United States Patent
Kim et al.

(10) Patent No.: US 8,699,120 B2
(45) Date of Patent: Apr. 15, 2014

(54) DISPLAY APPARATUS

(75) Inventors: Jae-Kyung Kim, Seoul (KR); Soo-Min Baek, Cheonan-si (KR); Min-Woo Kim, Hwaseong-si (KR); Il-Nam Kim, Hwaseong-si (KR); Hae-Yun Choi, Daegu (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 0 days.

(21) Appl. No.: 13/309,913

(22) Filed: Dec. 2, 2011

(65) Prior Publication Data

US 2013/0027765 A1    Jan. 31, 2013

(30) Foreign Application Priority Data

Jul. 29, 2011    (KR) .................. 10-2011-0076087

(51) Int. Cl.
*G02B 26/00* (2006.01)
(52) U.S. Cl.
USPC .......................................... 359/296

(58) Field of Classification Search
USPC ........ 359/296, 265–275; 345/107; 349/1, 56, 349/193
See application file for complete search history.

(56) References Cited

U.S. PATENT DOCUMENTS

| | | | |
|---|---|---|---|
| 6,330,043 B1 * | 12/2001 | Kikkawa et al. | 349/43 |
| 6,417,898 B1 * | 7/2002 | Izumi | 349/73 |
| 6,552,765 B2 * | 4/2003 | Kurata | 349/113 |
| 7,177,067 B1 * | 2/2007 | Sakamoto | 359/296 |
| 7,324,263 B2 * | 1/2008 | Johnson et al. | 359/296 |

FOREIGN PATENT DOCUMENTS

| | | |
|---|---|---|
| KR | 10-2009-0042379 | 4/2009 |
| KR | 10-2010-0045273 | 5/2010 |

\* cited by examiner

*Primary Examiner* — Tuyen Tra
(74) *Attorney, Agent, or Firm* — Robert E. Bushnell, Esq.

(57) ABSTRACT

A display apparatus capable of implementing high luminance and high contrast ratio (C/R) may include a first substrate, a second substrate disposed on the first substrate so as to face the first substrate and having a plurality of pixel regions defined therein, and a plurality of color filters formed on the plurality of pixel regions of the second substrate, each color filter having one or more holes formed therein.

22 Claims, 21 Drawing Sheets

DISPLAY APPARATUS

CLAIM OF PRIORITY

This application makes reference to, incorporates the same herein, and claims all benefits accruing under 35 U.S.C. §119 from an application earlier filed in the Korean Intellectual Property Office on the 29 Jul. 2011 and there duly assigned Serial No. 10-2011-0076087.

BACKGROUND OF THE INVENTION

1. Field of the Invention

The present invention relates to a display apparatus, and more particularly, to a display apparatus including a color filter.

2. Description of the Related Art

With the rapid evolution of information technology, the use of low power, lightweight, thin and high resolution display apparatuses has been growing. In recent years, demand for low power, lightweight, thin and high resolution display apparatuses has risen. To keep up with the demand, development of liquid display apparatuses (LCDs) or organic light emitting display devices (OLED) using organic light emitting characteristics is under way.

In addition, an electrophoretic display (EPD), such as an e-book or an e-newspaper convenient to read, capable of reducing eye fatigue and replacing the existing book or newspaper, has recently been drawing intensive attention.

In order to drive the electrophoretic display in a color mode, instead of a black-and-white mode, a color filter may be employed.

To drive the electrophoretic display as a top viewing type display apparatus in a color mode, a color filter is employed on an upper substrate. In the case where a color mode is implemented using a color filter, a considerable amount of incident light is reduced while passing through the color filter and only a small amount of reflected light can be viewed. Thus, it is difficult to implement a high-brightness color.

Alternatively, the electrophoretic display may be manufactured by bonding an upper substrate having a color filter to a lower substrate (TFT substrate). In this case, it is difficult to accurately align the upper substrate and the lower substrate. If the upper substrate and the lower substrate are misaligned, color mixing may occur, resulting in a considerable reduction in color purity.

SUMMARY OF THE INVENTION

The present invention provides a display apparatus capable of implementing high luminance and high contrast ratio (C/R).

The present invention also provides a display apparatus capable of misalignment between an upper substrate and a lower substrate of the display apparatus.

The above and other objects of the present invention will be described in, or be apparent from, the following description of the preferred embodiments.

According to an aspect of the present invention, a display apparatus may include a first substrate, a second substrate disposed on the first substrate so as to face the first substrate and having a plurality of pixel regions defined therein, and a plurality of color filters formed on the plurality of pixel regions of the second substrate and each having one or more holes formed therein.

According to another aspect of the present invention, a display apparatus may include a first substrate, a second substrate disposed on the first substrate so as to face the first substrate and having a plurality of pixel regions defined therein, and a color filter formed on the plurality of pixel regions of the second substrate, wherein the color filter includes a plurality of sub color filters spaced apart from each other.

According to still another aspect of the present invention, a display apparatus may include a first substrate, a second substrate disposed on the first substrate so as to face the first substrate and having a plurality of pixel regions defined therein, and a color filter formed on the plurality of pixel regions of the second substrate, wherein assuming L is a circumference of the color filter on one surface of the second substrate having the color filter and A is an area of the color filter, $L^2/A$ is greater than 16.

According to embodiments of the present invention, at least one of the following effects can be provided.

First, the display apparatus of the present invention, specifically the electrophoretic display, can implement high luminance and high C/R.

In addition, when an upper substrate and a lower substrate of the display apparatus are assembled to each other, a bonding margin can be increased, suppressing misalignment of the upper substrate and the lower substrate, thereby preventing color mixing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
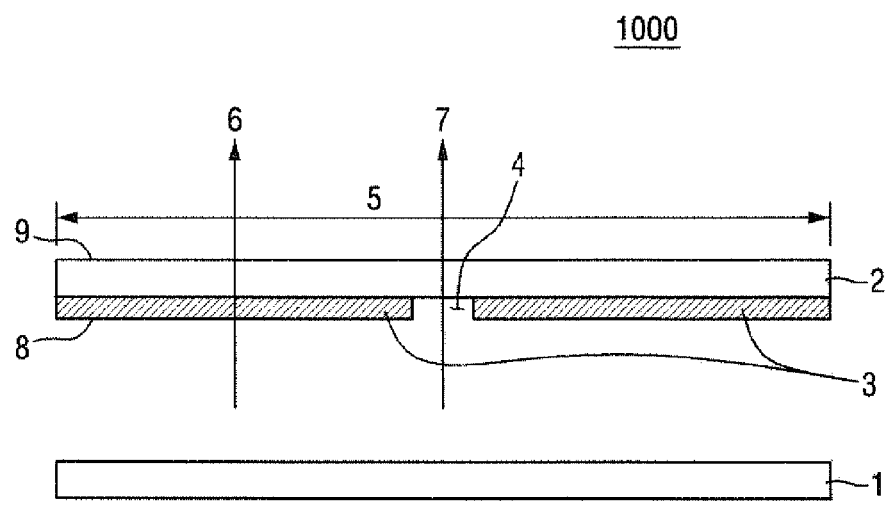
FIG. 1 is a cross-sectional view of a display apparatus according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Thus, in some embodiments, well-known structures and devices are not shown in order not to obscure the description of the invention with unnecessary detail. Like numbers refer to like elements throughout. In the drawings, the thickness of layers and regions are exaggerated for clarity.

It will be understood that, when an element or layer is referred to as being on or connected to another element or layer, it can be directly on or connected to the other element or layer or intervening elements or layers may be present. In contrast, when an element is referred to as being directly on or directly connected to another element or layer, there are no intervening elements or layers present. As used herein, the term "and/or" includes any and all combinations of one or more of the associated listed items.

Spatially relative terms, such as below, beneath, lower, above, upper, and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described by referring to plan views and/or cross-sectional views by way of ideal schematic views of the invention. Accordingly, the exemplary views may be modified depending on manufacturing technologies and/or tolerances. Therefore, the embodiments of the invention are not limited to those shown in the views, but include modifications in configuration formed on the basis of manufacturing processes. Therefore, regions exemplified in figures have schematic properties and shapes of regions shown in the figures, exemplify specific shapes of regions of elements, and do not limit aspects of the invention.

Hereinafter, the present invention will be described in further detail with reference to the accompanying drawings.

Figure 2:
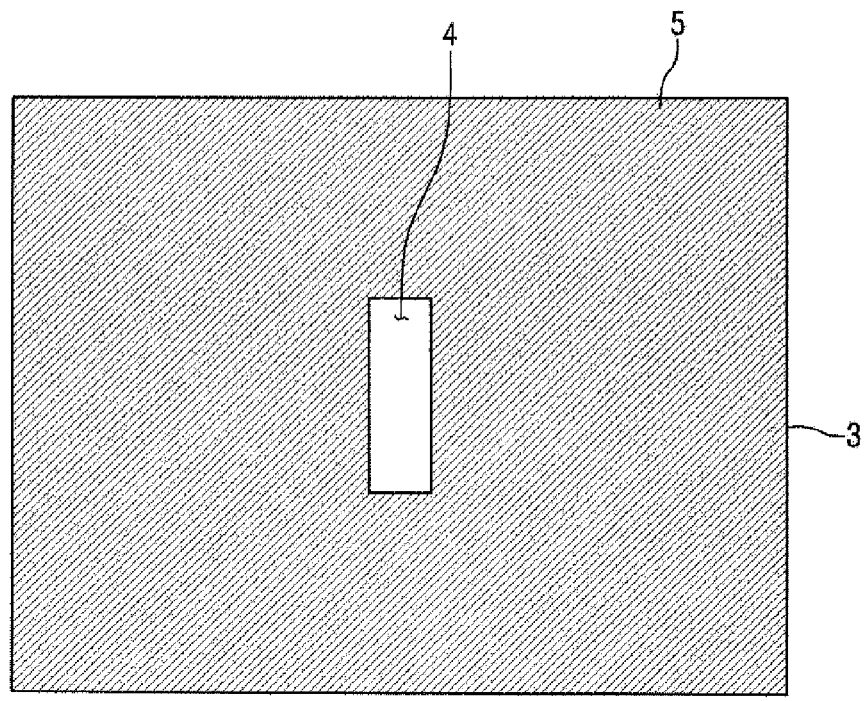
FIG. 2 is a top view of a pixel region shown in FIG. 1.

FIG. 1 is a cross-sectional view of a display apparatus according to an embodiment of the present invention, and FIG. 2 is a top view of a pixel region shown in FIG. 1.

Referring to FIGS. 1 and 2, the display apparatus 1000 includes a first substrate 1, a second substrate 2 and a color filter 3 formed on the second substrate 2.

The first substrate 1 and the second substrate 2 are disposed so as to face each other. A plurality of pixel regions 5 are defined on the second substrate 2. Furthermore, a plurality of pixel regions 5 may also be defined on the first substrate 1. The plurality of pixel regions 5 defined on the second substrate 2 and the plurality of pixel regions 5 defined on the first substrate 1 are formed in one-to-one correspondence, forming a pixel region space. For brevity, one pixel region 5 is illustrated in FIGS. 1 and 2.

The color filter 3 is formed on the second substrate 2. In the embodiment shown in FIG. 1, the color filter 3 is formed on one surface 8 of the second substrate 2 facing the first substrate 1. Alternatively, the color filter 3 may be formed on the other surface 9 of the second substrate 2.

The color filter 3 is disposed so as to occupy the pixel region 5 defined on the second substrate 2. The color filter 3 is capable of filtering one or more colors.

One or more holes 4 are formed on the color filter 3. The holes 4 are spaces free of a material forming the color filter 3. When another intervening layer is not present between the color filter 3 and the second substrate 2, the holes 4 expose the second substrate 2.

With this structure, the light transmitting through the second substrate 2 in a thickness direction of the second substrate 2 demonstrates different light transmitting characteristics according to two different regions. As shown in FIG. 1, assuming that light is incident on the one surface 8 of the second substrate 2, first light 6 transmitting through a region occupied by the color filter 3 has a transmission path including the color filter 3 and the second substrate 2, while second light 7 transmitting through the holes 4 has a transmission path including only the second substrate 2 without the color filter 3.

In a case of first light 6, light in a considerable number of frequency regions can be absorbed while transmitting through the color filter 3, and some in filtered frequency regions can also be absorbed by the color filter 3. When the transmitted light reaches the second substrate 2, it may be partially reflected at an interface between the second substrate 2 and the color filter 3 and some may be absorbed into the second substrate 2. Thus, the finally transmitted light has considerably reduced luminance, compared to the incident light.

Since the second light 7 transmits through only the second substrate 2, it is not absorbed by the color filter 3. Thus, it is easily expected that the finally transmitted light has much higher luminance than the second light 7. Since the holes 4 are formed in the color filter 3, the color or luminance of light can be controlled according to the region in various manners. That is to say, the color and luminance of light can be more variously and freely controlled according to the pixel region.

Hereinafter, various embodiments of the present invention will be described in detail. In the following description, the invention will be described with regard to an electrophoretic display as a display apparatus, but is not limited thereto.

Figure 3:
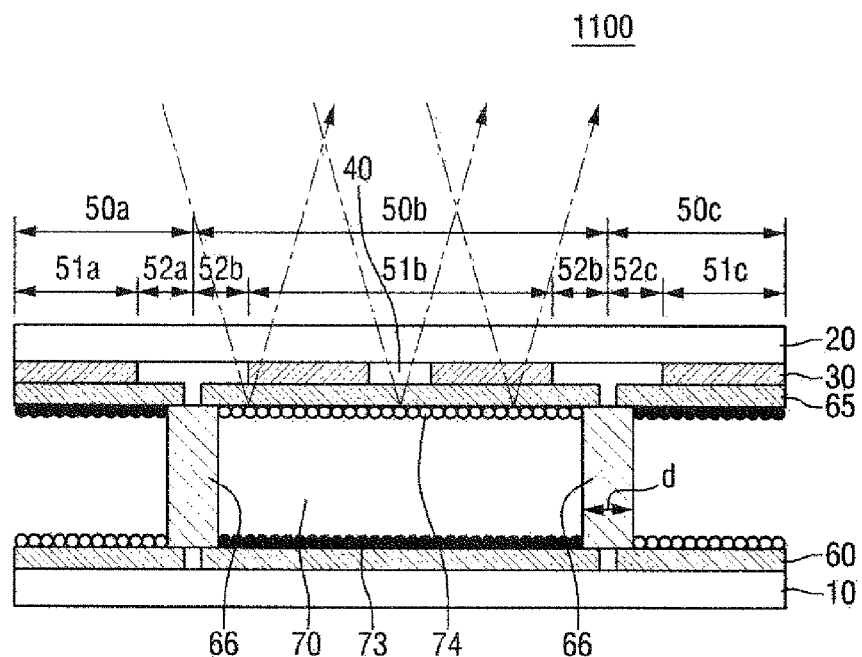
FIGS. 3 through 5 are cross-sectional views of display apparatuses according to various embodiments of the present invention.

FIG. 3 is a cross-sectional view of a display apparatus according to an embodiment of the present invention.

Referring to FIG. 3, an electrophoretic display 1100 includes a lower substrate 10, an upper substrate 20 facing the lower substrate 10, an electrophoretic layer 70 interposed between the lower substrate 10 and the upper substrate 20, and a color filter 30 formed on at least one of the lower substrate 10 and the upper substrate 20.

The lower substrate 10 may be made of an insulating material such as glass or plastic. The upper substrate 20 may also be made of an insulating material such as glass or plastic. The lower substrate 10 or the upper substrate 20 may be made of the same material. For example, both the lower substrate 10 and the upper substrate 20 may be transparent substrates made of glass. Alternatively, in a case where the electrophoretic display 1100 is a top viewing type display, the upper substrate 20 needs to be a transparent substrate, but the lower substrate 10 may be an opaque substrate.

One or more conductive material layers and one or more insulating material layers may be formed on the lower substrate 10. The conductive material layers may include various electrodes and wires for applying signals to the electrodes. The wires may include a plurality of gate wires, a plurality of data wires, pixel electrodes, and so on. The insulating material layers may include a gate insulation layer, an interlayer dielectric layer, and/or a passivation layer. Furthermore, one or more switch devices including a semiconductor layer may be formed on the lower substrate 10. Each of the switch devices corresponds to at least one pixel electrode, thereby turning on or off a voltage applied to the pixel electrode.

The lower substrate 10 may be divided into a plurality of pixel regions 50a, 50b and 50c. The one or more conductive material layers and the one or more insulating material layers may be appropriately disposed on each of the plurality of pixel regions 50a, 50b and 50c, thereby independently driving pixels, respectively. One pixel electrode corresponding to one pixel region may be disposed on the pixel region, but not limited thereto. Alternatively, two or more pixel electrodes may be disposed on one pixel region.

For brevity, FIG. 3 illustrates that only the pixel electrode is disposed on the lower substrate 10 and one pixel region is occupied by one pixel electrode. However, one skilled in the art can easily understand that various conductive material layers and insulating material layers, as well as the pixel electrode, can be appropriately arranged.

The plurality of pixel regions 50a, 50b and 50c are defined on the upper substrate 20. The respective plurality of pixel regions 50a, 50b and 50c defined on the upper substrate 20 are disposed so as to be in one-to-one correspondence with the plurality of pixel regions defined on the lower substrate 10, forming a pixel region space.

The plurality of pixel regions 50a, 50b and 50c defined on the upper substrate 20 may include first regions 51a, 51b and 51c and second regions 52a, 52b and 52c surrounding the first regions 51a, 51b and 51c. The color filter 30 may be disposed on the first regions 51a, 51b and 51c of the plurality of pixel regions 50a, 50b and 50c defined on the upper substrate 20, and the color filter 30 may not be disposed on the second region 52a, 52b and 52c of the plurality of pixel regions defined on the upper substrate 20. The second region 52a, 52b and 52c of adjacent pixel regions may be adjacent to each other.

The second region 52a, 52b and 52c without the color filter 30 may provide a process margin for preventing misalignment of the upper substrate 20 and the lower substrate 10 when assembling the upper substrate 20 and the lower substrate 10 to each other. In detail, as described above, the plurality of pixel regions 50a, 50b and 50c defined on the upper substrate 20 and the plurality of pixel regions defined on the lower substrate 10 are formed in one-to-one correspondence, forming a pixel region space. Here, when the lower substrate 10 and the upper substrate 20 are assembled to each other, it is not easy to accurately align the pixel region 50a, 50b and 50c of the upper substrate 20 with the pixel regions of the lower substrate 10. If two colors of the upper substrate 20 are disposed so as to correspond to one pixel region of the lower substrate 10, when misalignment occurs, color mixing may occur, or color purity may be considerably reduced. Since the color filter 30 is not formed on the second region 52a, 52b and 52c, color mixing may be prevented to an extent. That is to say, even if misalignment occurs, when the misalignment occurs at least within the second regions 52a, 52b and 52c, it is possible to prevent two colors of the upper substrate 20 from being arranged on one pixel region of the lower substrate. Furthermore, even if misalignment occurs severely enough to deviate from the second region 52a, 52b and 52c, only colors in the regions deviating from the second region 52a, 52b and 52c are mixed, thereby suppressing color mixing or preventing a reduction in color purity.

Each color filter 30 has one or more holes 40 formed therein. The holes 40 are spaces free of a material forming the color filter 30. When another intervening layer is not present between the color filter 30 and the upper substrate 20, the holes 40 expose the upper substrate 20. In some embodiments, although not shown, when an overcoating layer is formed on the color filter 30, internal spaces of the holes 40 may be filled with the overcoating layer. Alternatively, at least some of the holes 40 may have empty spaces that are not filled by an overcoating layer.

The display apparatus may include partition walls 66 disposed between the lower substrate 10 and the upper substrate 20. The partition walls 66 may be shaped as pillars, and may separate the plurality of pixel regions 50a, 50b and 50c defined on the upper substrate 20 and those defined on the lower substrate 10 from one another. In order to separate the plurality of pixel regions 50a, 50b and 50c defined on the upper substrate 20 and those defined on the lower substrate 10 from one another, the partition walls 66 may be disposed on the second region 52a, 52b and 52c of the plurality of pixel regions 50a, 50b and 50c defined on the upper substrate 20 and the lower substrate 10. In some embodiments, the partition walls 66 may be disposed so as to occupy not only a second region of one pixel region but also at least a portion of the second region of another adjacent pixel region. In addition, as seen from the cross-sectional view of FIG. 3, widths 'd' of the partition walls 66 may be smaller than widths of the second region 52a, 52b and 52c.

The partition walls 66 disposed between the lower substrate 10 and the upper substrate 20 may form a pixel region space together with the pixel regions of the lower substrate 10 and the plurality of pixel regions 50a, 50b and 50c of the upper substrate 20 facing the lower substrate 10. The pixel region space may be filled with the electrophoretic layer 70.

The electrophoretic layer 70 may include a fluid. Furthermore, the electrophoretic layer 70 may include colored charged particles dispersed in the fluid. The fluid included in the electrophoretic layer 70 may be gas or liquid solvent. The fluid may protect the colored charged particles dispersed therein from external impacts.

Figure 4:
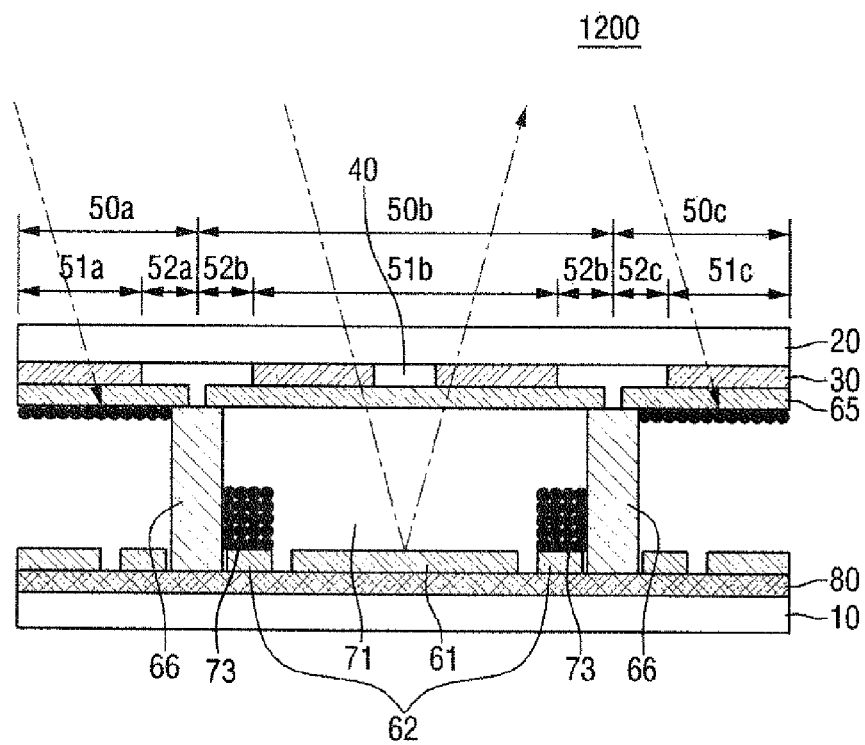
Figure 5:
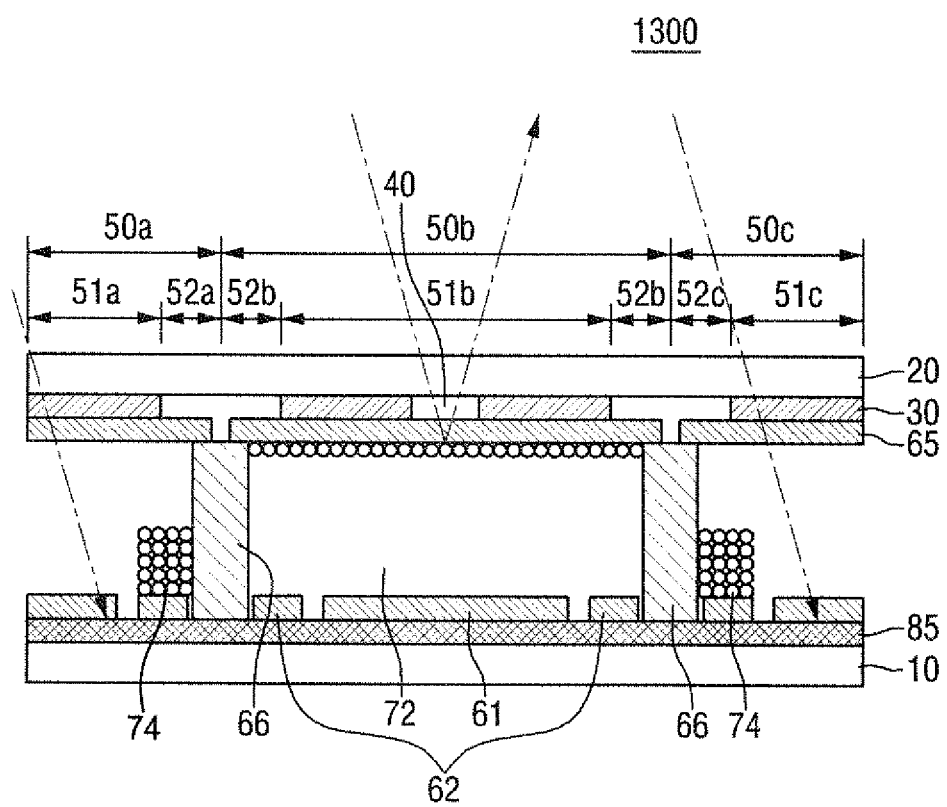

The colored charged particles dispersed in the electrophoretic layer 70 may have a predetermined color and may be positively charged or negatively charged. In some embodiments, the colored charged particles may include both white charged particles 74 and black charged particles 73. Alternatively, the colored charged particles may be any one of the white charged particles 74 and the black charged particles 73. FIG. 3 illustrates that the electrophoretic layer 70 of the electrophoretic display 1100 includes both the white charged particles 74 and the black charged particles 73. FIG. 4 illustrates that the electrophoretic layer 71 of the electrophoretic display 1200 includes the black charged particles 73 only, while FIG. 5 illustrates that the electrophoretic layer 72 of the electrophoretic display 1300 includes the white charged particles 74 only. These arrangements will be described later.

Referring to FIG. 3, a first electrode 60 may be formed on the lower substrate 10 and a second electrode 65 may be formed on the upper substrate 20. The first electrode 60 and the second electrode 65 may be made of transparent conductive materials. The first electrode 60 and the second electrode 65 may be made of substantially the same material. For example, the first electrode 60 and the second electrode 65 may be made of indium tin oxide (ITO) or indium zinc oxide (IZO).

As shown in FIG. 3, the first electrode 60 formed on the lower substrate 10 and the second electrode 65 formed on the upper substrate 20 may be separately formed for each of the plurality of pixel regions 50a, 50b and 50c. In some embodiments, the first electrode 60 formed on the lower substrate 10 may be separately formed for each of the plurality of pixel regions 50a, 50b and 50c while the second electrode 65 formed on the upper substrate 20 may be formed as a single electrode. When the second electrode 65 is formed as a single electrode, the plurality of pixel regions 50a, 50b and 50c may share the second electrode 65.

Hereinafter, a driving mechanism of a display apparatus according to an embodiment of the present invention will be described with reference to FIG. 3. In the following description, for the sake of convenient explanation, it is assumed that, among the colored charged particles dispersed in the electrophoretic layer 70, the white charged particles 74 are positively charged and the black charged particles 73 are negatively charged. However, it is also evident to one skilled in the art that the white charged articles 74 can be negatively charged and the black charged particles 73 can be positively charged.

In order to drive the electrophoretic display 1100, a positive voltage and a negative voltage may be applied to the first electrode 60 and the second electrode 65, respectively. When the positive voltage is applied to the first electrode 60, the white charged particles 74 that are negatively charged move toward the first electrode 60. In addition, when the negative voltage is applied to the first electrode 60, the black charged particles 73 that are positively charged move toward the first electrode 60.

FIG. 3 illustrates a state in which a negative voltage is applied to the first electrode 60 of a centrally positioned pixel region 50b and a positive voltage is applied to the second electrode 65 of the centrally positioned pixel region 50b. In addition, a positive voltage is applied to first electrodes 60 of pixel regions 50a and 50c positioned in the left and right with respect to the centrally positioned pixel region 50b shown in FIG. 3, and a negative voltage is applied to second electrodes 65 thereof.

For the sake of convenient explanation, it is assumed that a red color filter is formed on the left pixel region 50a and the left pixel region 50a is a pixel region for displaying a red color. It is also assumed that a green color filter is formed on the central pixel region 50b and the central pixel region 50b is a pixel region for displaying a green color. Furthermore, it is assumed that a blue color filter is formed on the right pixel region 50c and the right pixel region 50c is a pixel region for displaying a blue color.

For the sake of convenient explanation, it is assumed that transmissivity of the color filter 30 formed on each pixel region is approximately 30%. While incident light may be refracted or absorbed at an interface between the color filter 30 and the upper substrate 20, such interfacial characteristics may not be taken into consideration.

As the voltages are applied, the white charged particles 74 in the central pixel region 50b move toward the upper substrate 20 and are positioned on the upper substrate 20, and the black charged particles 73 in the central pixel region 50b move toward the lower substrate 10 and are positioned on the lower substrate 10. In addition, the black charged particles 73 in the left pixel regions 50a with respect to the central pixel region 50b move toward the upper substrate 20 so as to then be positioned, and the white charged particles 74 in the right pixel regions 50c with respect to the central pixel region 50b move toward the lower substrate 10 so as to then be positioned. Only green color displayed in the central pixel region 50b can be viewed from a top portion of the electrophoretic display 1100 by arranging the charged particles in such manners.

As described above, in the case where a color mode is implemented using a color filter, a considerable amount of incident light is reduced while passing through the color filter, and only a small amount of reflected amount can be viewed. As described above, assuming that the transmissivity of the color filter is approximately 30%, only the reflected light of approximately 9% the incident light can be viewed. Thus, it is difficult to realize a high luminance color.

In the display apparatus 1100 according to an embodiment of the present invention, while the color filters 30 are formed on the first regions 51a, 51b and 51c of the plurality of pixel regions 50a, 50b and 50c, the color filters 30 are not formed on the second regions 52a, 52b and 52c surrounding the first regions 51a, 51b and 51c. In addition, one or more holes 40 are formed in the color filters 30 formed on the first regions 51a, 51b and 51c of the plurality of pixel regions 50a, 50b and 50c of the upper substrate 20.

FIG. 3 illustrates three types of light beams incident into the central pixel region. First, the incident light shown in the right side passes through the color filter 30 one time until reaching the white charged particles 74, and passes through the color filter 30 one more time when being reflected at the white charged particles 74. Thus, since the incident light shown in the right side passes through the color filter 30 two times, the reflected light corresponding to approximately 9% the incident light can only be viewed. In addition, the viewed color may be low luminance green.

On the other hand, the incident light shown in the left side does not pass through the color filter 30 before reaching the white charged particles 74, but passes through the color filter 30 just one time when being reflected at the white charged particles 74. Thus, the reflected light corresponding to approximately 30% the incident light can be viewed.

Next, the incident light shown in the center does not pass through the color filter 30 when reaching or being reflected from the white charged particles 74. Thus, in this case, the reflected light corresponding to 100% the incident light can be viewed. In addition, since the incident light is reflected without passing through the color filter 30, the viewed color may be white.

Users can view all of the reflected light for the three incident light beams. Since the luminance of the color viewed by the users is an average of luminance levels of the three reflected light beams, the users can view a color having higher luminance than in a case where all of the incident light beams pass through a color filter two times. Therefore, the color and luminance of light can be controlled in various manners, and an electrophoretic display having high luminance and high contrast ratio (C/R) can be implemented.

FIGS. 4 and 5 are cross-sectional views of display apparatuses according to various embodiments of the present invention.

Referring to FIG. 4, an electrophoretic display 1200 is different from the display apparatus shown in FIG. 3 in that it further includes a third electrode 62 formed on a lower substrate 10, the lower substrate 10 further includes a reflection plate 80, and an electrophoretic layer 71 includes only black charged particles 73.

The black charged particles 73 dispersed in the electrophoretic layer 71 may be positively charged or negatively charged. In FIG. 4, for the sake of convenient explanation, it is assumed that the black charged particles 73 are positively charged.

A third electrode 62 may be formed on the lower substrate 10. The third electrode 62 may be spaced apart from the first electrode 61 on the lower substrate 10. The third electrode 62 may be made of a transparent conductive material. The third electrode 62 may be made of substantially the same material as the first electrode 61 and the second electrode 65. For example, the third electrode 62 may be made of indium tin oxide (ITO) or indium zinc oxide (IZO).

A reflection plate 80 may be disposed on the lower substrate 10. The reflection plate 80 may be disposed at locations corresponding to a plurality of pixel regions 50a, 50b and 50c on the lower substrate 10. The reflection plate 80 allows the light incident through the upper substrate 20 to be reflected back to the upper substrate 20, and may be disposed between the lower substrate 10 and the first and third electrodes 61 and 62, respectively. The reflection plate 80 may include a material having highest reflectivity at a visible light range. Thus, the light reflected at the reflection plate 80 may be viewed as white.

FIG. 4 illustrates a state in which a positive voltage is applied to the first and second electrodes 61 and 65, respectively, of the central pixel region 50*b* and a negative voltage is applied to the third electrode 62. In addition, a positive voltage is applied to first and third electrodes 61 and 62, respectively, of the pixel regions 50*a* and 50*c* positioned to the left and right, respectively, with respect to the central pixel region 50*b*, and a negative voltage is applied to the second electrode 65.

As the voltages are applied, the black charged particles 73 in the central pixel region 50*b* move toward the third electrode 62 so as to then be positioned, and the black charged particles 73 in the left and right pixel regions 50*a* and 50*c*, respectively, move toward the second electrode 65, that is, the upper substrate 20, so as to then be positioned. Only the reflected light in the central pixel region 50*b*, in which the incident light is reflected by the reflection plate 80, can be viewed from a top portion of the electrophoretic display 1200 by arranging the charged particles in such manners.

In addition, since holes are formed in the color filter, the electrophoretic display having high luminance and high contrast ratio (C/R) can be implemented, which is the same as described above, and a repeated description will be omitted.

Referring to FIG. 5, an electrophoretic display 1300 according to this embodiment is different from the display apparatus shown in FIG. 3 in that it may further include a third electrode 62 formed on a lower substrate 10, the lower substrate 10 further includes a black matrix 85, and an electrophoretic layer 72 includes only white charged particles 74.

The white charged particles 74 dispersed in the electrophoretic layer 72 may be positively charged or negatively charged. In FIG. 5, for the sake of convenient explanation, it is assumed that the white charged particles 74 are positively charged.

A third electrode 62 may be formed on the lower substrate 10. The third electrode 62 is substantially the same as that shown in FIG. 4, and repeated descriptions will be omitted.

A black matrix 85 may be disposed on the lower substrate 10. The black matrix 85 may be disposed at locations corresponding to a plurality of pixel regions 50*a*, 50*b* and 50*c* on the lower substrate 10. The black matrix 85 allows the light incident through the upper substrate 20 to be absorbed, and may be disposed between the lower substrate 10 and the first and third electrodes 61 and 62, respectively.

FIG. 5 illustrates a state in which a positive voltage is applied to the first and second electrodes 61 and 65, respectively, of the central pixel region 50*b*, and a negative voltage is applied to the third electrode 62. In addition, a positive voltage is applied to first and third electrodes 61 and 62, respectively, of the pixel regions 50*a* and 50*c* positioned to the left and right, respectively, with respect to the central pixel region 50*b*, and a negative voltage is applied to the second electrode 65. In addition, a positive voltage is applied to first and second electrodes 61 and 65, respectively, of the pixel regions 50*a* and 50*c* positioned to the left and right, respectively, with respect to the central pixel region 50*b*, and a negative voltage is applied to the third electrode 62.

As the voltages are applied, the white charged particles 74 in the central pixel region 50*b* move toward the second electrode 65, that is, the upper substrate 20, so as to then be positioned, and the white charged particles 74 in the left and right pixel regions 50*a* and 50*c*, respectively, move toward the third electrode 62 so as to then be positioned. Only the reflected light in the central pixel region 50*b*, in which the incident light is reflected by the white charged particles 74, can be viewed from a top portion of the electrophoretic display 1300 by arranging the charged particles in such manners.

In addition, since holes are formed in the color filter, the electrophoretic display having high luminance and high contrast ratio (C/R) can be implemented, which is the same as described above, and repeated descriptions will be omitted.

Figure 6:
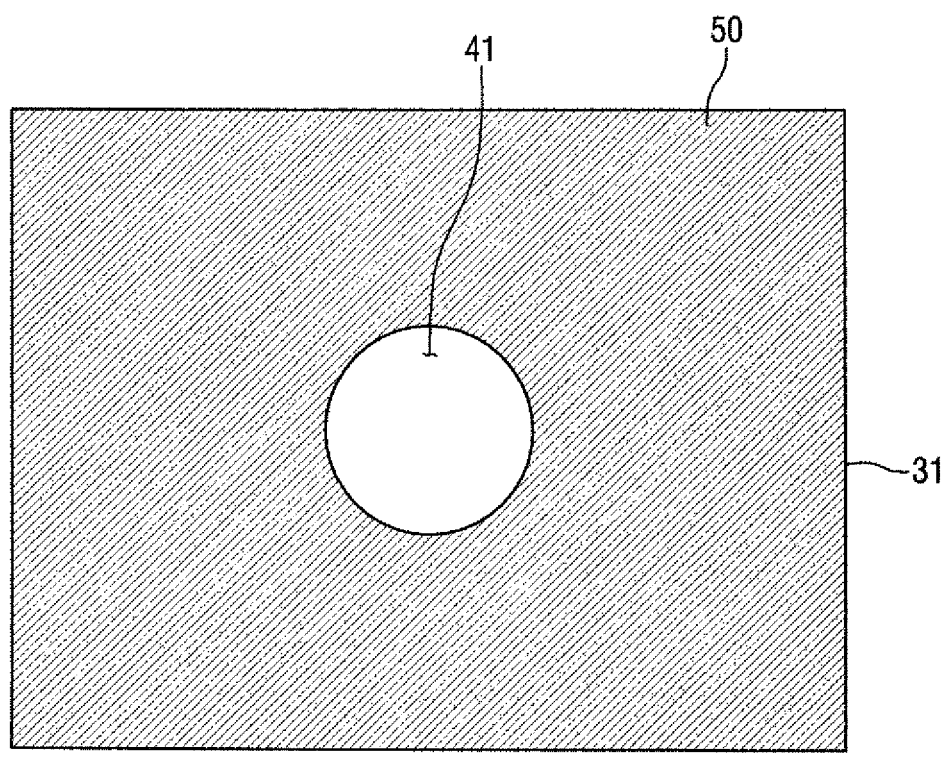
FIGS. 6 through 11 are top views of pixel regions according to various embodiments of the present invention.
Figure 7:
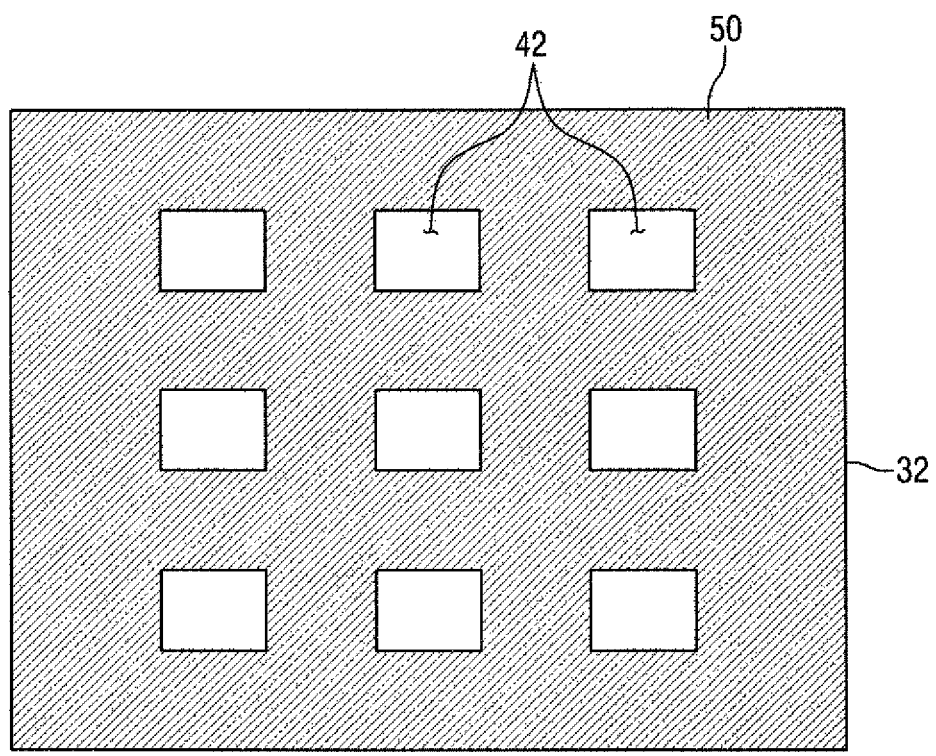

FIGS. 6 and 7 are top views of pixel regions according to various embodiments of the present invention.

Referring to FIG. 6, an electrophoretic display according to this embodiment is substantially the same as the display apparatus shown in FIG. 2, except that a hole 41 formed in a color filter 31 formed on a pixel region 50 is circular, and a repeated description will be omitted.

While FIGS. 2 and 6 show that the holes are shaped of a rectangular slit and a circle, respectively, the holes may have other shapes and may have different sizes.

Referring to FIG. 7, an electrophoretic display according to this embodiment is substantially the same as the display apparatus shown in FIG. 2, except that a plurality of holes 42 are formed in a color filter 32 disposed on a pixel region 50, and a repeated description will be omitted.

An area of the color filter 32 formed on the pixel region 50 is approximately 75 to 85% that of the pixel region 50. In addition, the area of the color filter 32 formed on the pixel region 50 may not exceed approximately 80% that of pixel region 50. As described above, an amount of light passing through the holes can be adjusted by adjusting an area ratio of color filters formed on the pixel region 50, and the luminance can be controlled, thereby implementing an electrophoretic display having high luminance and high C/R.

Figure 8:
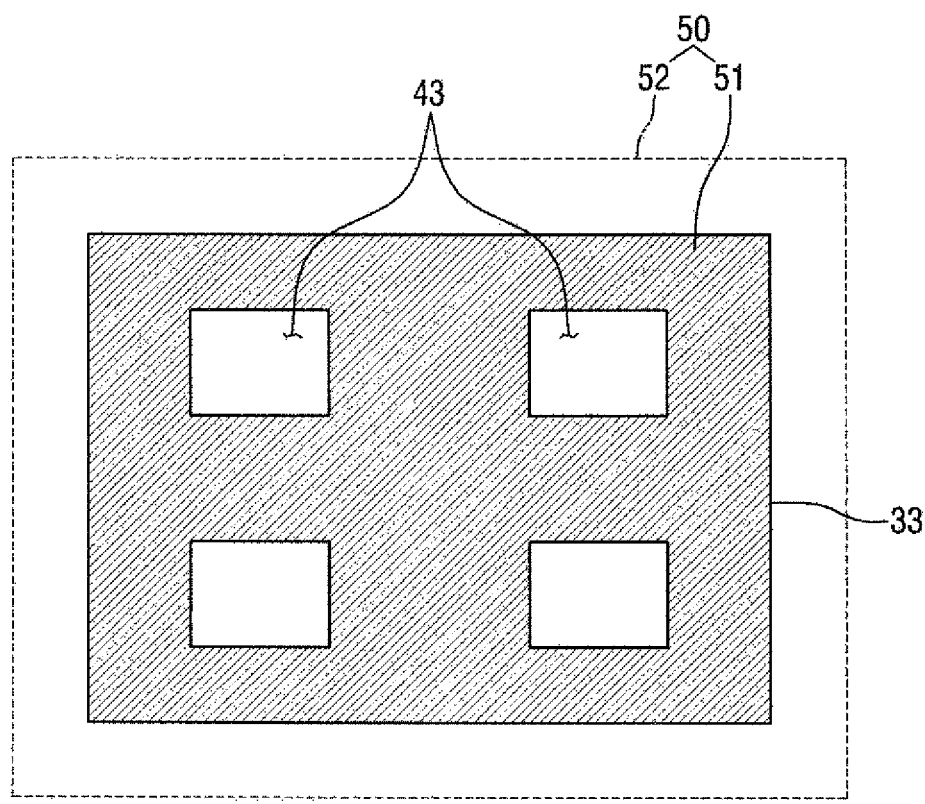

FIG. 8 is a top view of a pixel region according to another embodiment of the present invention.

Referring to FIG. 8, the pixel region 50 is substantially the same as that shown in FIG. 2, except that it includes a first region 51 and a second region 52 surrounding the first region 51, and a color filter 33 is formed in the first region 51. A repeated description will be omitted.

The color filter 33 may be formed on the first region 51, and one or more holes 43 may be formed in the color filter 33. While FIG. 8 illustrates that the first region 51 has a rectangular shape, it may have a circular shape or other various shapes.

An area of the color filter 33 is approximately 75 to 85% that of the pixel region 50. In addition, the area of the color filter 33 formed on the pixel region 50 may not exceed approximately 80% that of the pixel region 50. As described above, an amount of light passing through the holes 43 or the second region 52 without passing through the color filter 33 can be adjusted by adjusting an area ratio of color filters formed on the pixel region 50, and the luminance can be controlled, thereby implementing an electrophoretic display having high luminance and high C/R.

In addition, partition walls 66 (seen in FIGS. 3,4 and 5) disposed between a lower substrate and an upper substrate may contact the second region 52 where the color filter 33 is not formed. As described above, the use of the second region 52 of the pixel region 50, where the partition walls 66 are disposed, may form an increased bonding margin. Accordingly, misalignment of the upper substrate and the lower substrate can be suppressed, thereby preventing color mixing and improving color purity.

Figure 9:
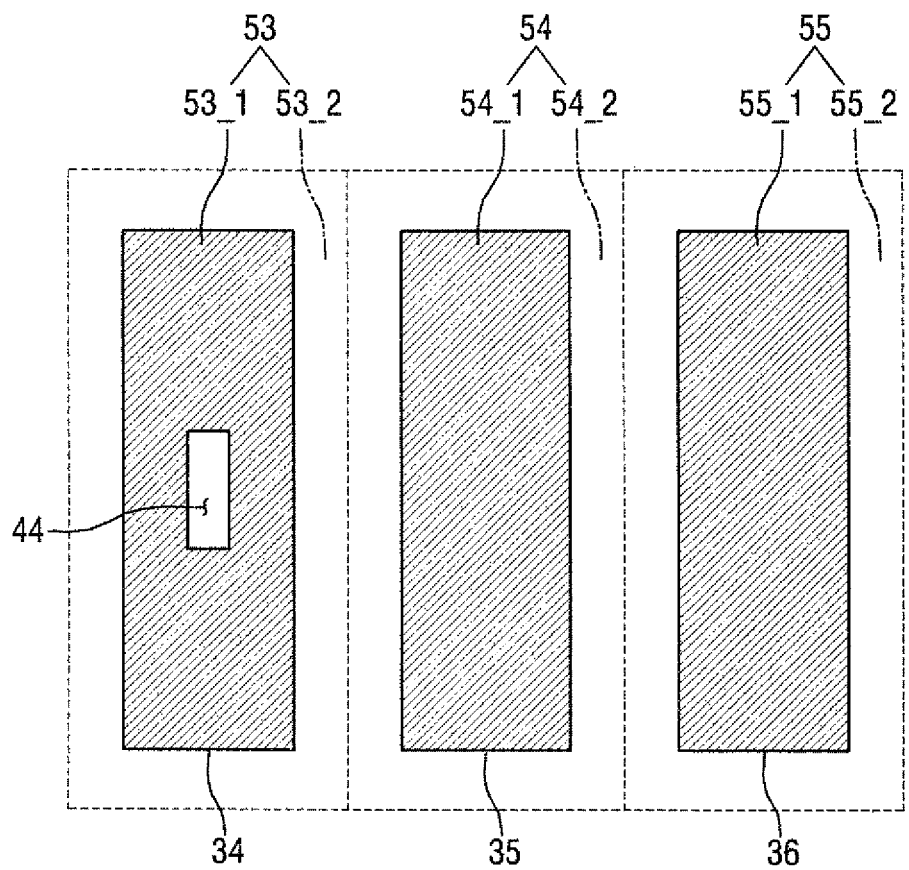
Figure 10:
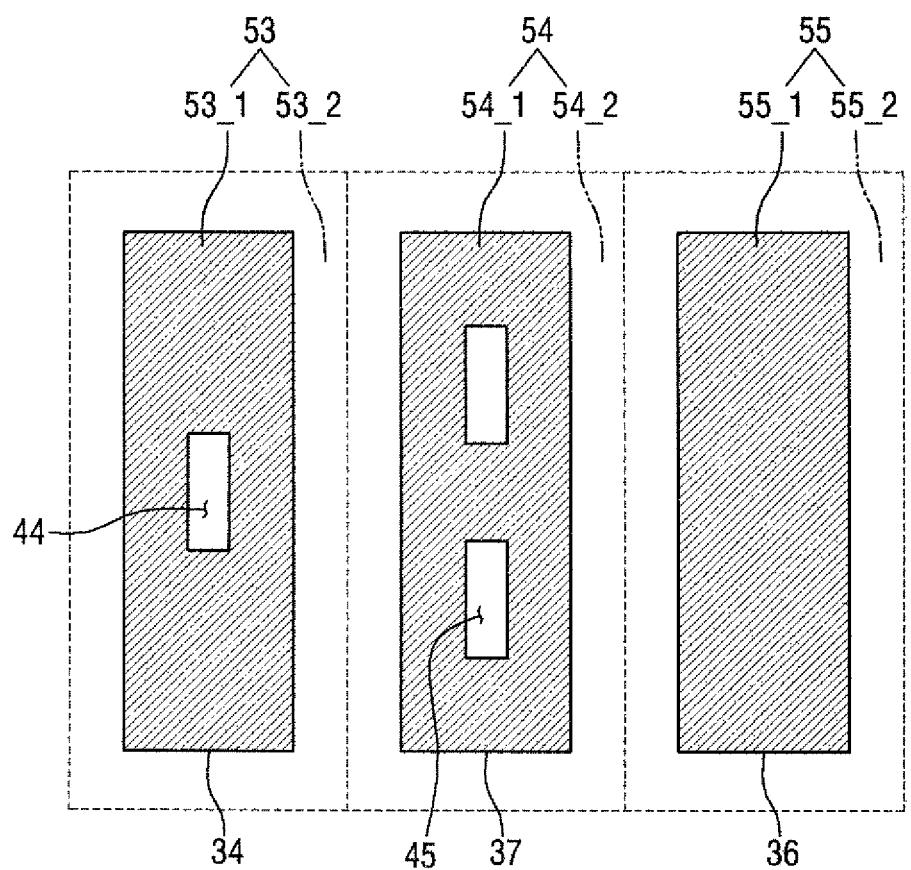
Figure 11:
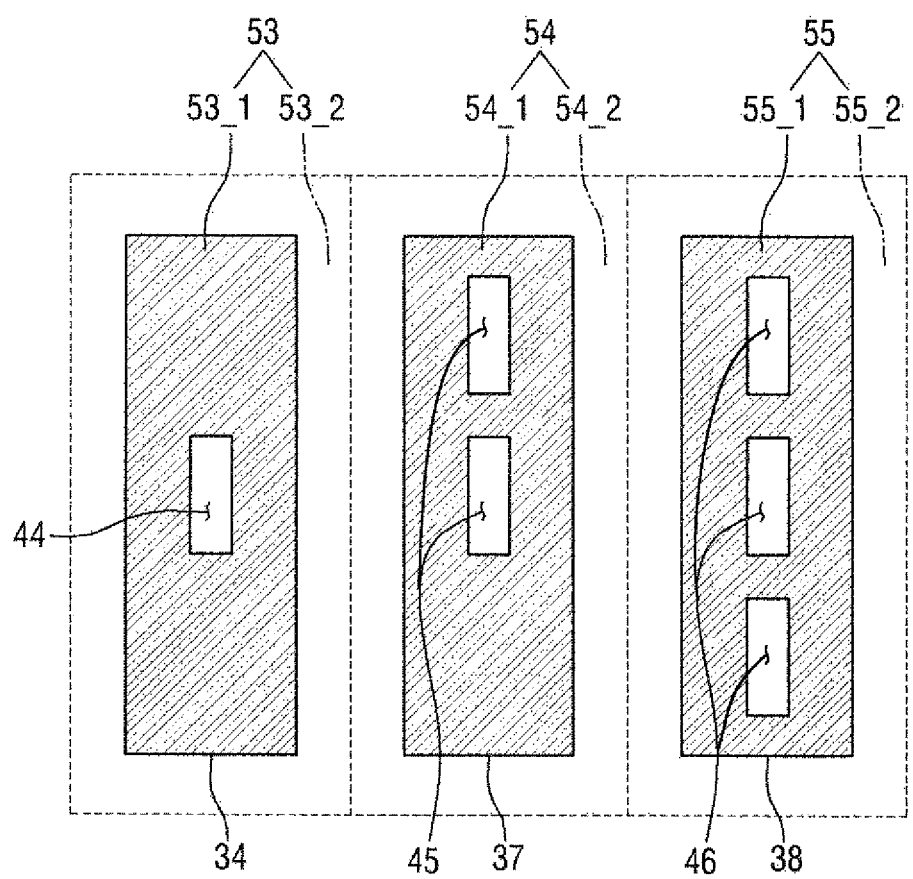
Figure 12:
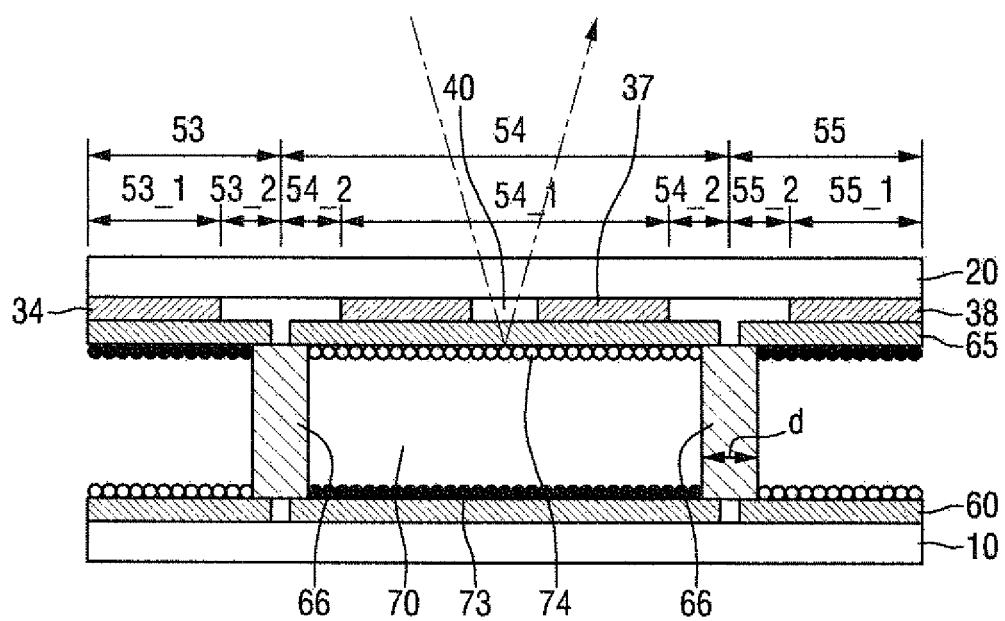
FIG. 12 is a cross-sectional view of a display apparatus including the pixel region shown in FIG. 11.

FIGS. 9 to 11 are top views of pixel regions according to various embodiments of the present invention, and FIG. 12 is a cross-sectional view of a display apparatus including the pixel region shown in FIG. 11.

Referring to FIGS. 9 and 12, the pixel regions and color filters of the present invention are substantially the same as those shown in FIGS. 2 and 3, except that the pixel region may include a first pixel region 53 for displaying a first color, a second pixel region 54 for displaying a second color, and a third pixel region 55 for displaying a third color, and the color filter may include first to third color filters 34, 35/37 and 36/38, respectively, formed on first to third pixel regions 53, 54 and 55, respectively, and a repeated description will be omitted.

The pixel region may include a first pixel region 53 for displaying a first color, a second pixel region 54 for displaying a second color, and a third pixel region 55 for displaying a third color. The first color, the second color and the third color may be different colors, and may correspond to red, green and blue (RGB) colors, or cyan (C), magenta (M) and yellow (Y) colors, respectively. In some embodiments, the first color and the third color may be the same color, and the second color may be different from the first color and the third color.

As shown in FIG. 9, the first pixel region 53, the second pixel region 54 and the third pixel region 55 may be disposed in parallel with each other. Alternatively, the first pixel region 53, the second pixel region 54 and the third pixel region 55 may also be disposed in an L shape.

The pixel region may further include a fourth pixel region for displaying a fourth color. The fourth color may be white. In the case where the pixel region further includes a fourth pixel region, red, green, blue, and white (RGBW) colors can be implemented.

The color filter may include first to third color filters 34, 35/37, 36/38 formed on the first to third pixel regions 53, 54 and 55, respectively.

Referring to FIG. 9, the first to third color filters 34, 35 and 36, respectively, may be formed for displaying various colors in the first to third pixel regions 53, 54 and 55, respectively, having the first to third color filters 34, 35 and 36, respectively, formed thereon.

Referring to FIG. 10, the pixel region of the current embodiment is substantially the same as that of the embodiment shown in FIG. 9, except that numbers of holes formed in first to third color filters 34, 37 and 36, respectively, are different from those of holes formed in the first to third color filters 34, 35 and 36, respectively, shown in FIG. 9, and a repeated description will be omitted.

Referring to FIG. 11, the pixel region of the current embodiment is substantially the same as that of the embodiment shown in FIG. 9, except that numbers of holes formed in first to third color filters 34, 37 and 38, respectively, are different from those of holes formed in the first to third color filters 34, 35 and 36, respectively, shown in FIG. 9, and a repeated description will be omitted.

The first to third color filters and holes formed therein will now be described in detail with reference to FIGS. 9 through 11.

One or more holes 44, 45 and 46 may be formed on at least one of the first to third color filters 34, 35/37 and 36/38, respectively. The holes 44, 45 and 46 may be formed on only one or all of the first to third color filters 34, 35/37 and 36/38, respectively. For the sake of convenient explanation, it is assumed that the first pixel regions 53 shown in FIGS. 9 through 11 are pixel regions for display a red color, the second pixel regions 54 are pixel regions for display a green color, and the third pixel region 55 are pixel regions for display a blue color, and the respective holes have the same size.

Referring to FIG. 9, one hole 44 is formed in the first color filter 34 formed on the first pixel region 53, and no hole is formed on the second color filter 35 or the third color filter 36 formed on the second pixel region 54 or the third pixel region 55. With this configuration, luminance levels of the entire pixel regions can be controlled, and only red luminance can be separately controlled.

In more detail, as shown in FIG. 9, since the hole 44 is formed only in the first color filter 34 for displaying a red color, an amount of light that does not pass through the color filter is increased in the first pixel region 53, compared to the second pixel region 54 and the third pixel region 55. Thus, red luminance may be higher than green or blue luminance.

Referring to FIG. 10, one hole 44 is formed in the first color filter 34 formed on the first pixel region 53, two holes 45 are formed in the second color filter 37 formed on the first pixel region 54, and no hole is formed on the third color filter 36 formed on the third pixel region 55. With this configuration, luminance levels of the entire pixel regions can be controlled, and only red and green luminance levels can be separately controlled.

In more detail, as shown in FIG. 10, since one hole 44 is formed in the first color filter 34 for display of a red color and two holes 45 are formed in the second color filter 37 for display of a green color, the amount of light that does not pass through a color filter increases in order of the third pixel region 55, the first pixel region 53 and the second pixel region 54. Accordingly, the luminance is also enhanced in order of blue, red and green color.

Referring to FIG. 11, one hole 44 is formed in the first color filter 34 formed on the first pixel region 53, two holes 45 are formed in the second color filter 37 formed in the second pixel region 54, and three holes 46 are formed in the third color filter 38 formed in the third pixel region 55. With this configuration, luminance levels of the entire pixel regions can be controlled, and red, green and blue luminance levels can be separately controlled.

In more detail, as shown in FIG. 11, since one hole 44 is formed in the first color filter 34 for display of a red color, two holes 45 are formed in the second color filter 37 for display of a green color, and three holes 46 are formed in the third color filter 38 for display of a blue color, the amount of light that does not pass through a color filter increases in order of the first pixel region 53, the second pixel region 54 and the third pixel region 55. Accordingly, the luminance is also enhanced in order of red, green and blue color.

In an exemplary embodiment of the present invention, a color filter is formed only on a first region of a pixel region and one or more holes are formed in the color filter, thereby increasing the amount of light incident into an upper substrate, which light does not pass through the color filter. Therefore, an electrophoretic display having high luminance and high C/R can be implemented.

In addition, in an exemplary embodiment of the present invention, the color or luminance of light can be controlled in various manners by adjusting the number of holes formed in first to third color filters. In order to increase first color luminance, compared to second color luminance, more holes can be formed in the first color filter than in the second or third color filter. Accordingly, the amount of light passing through the first color filter can be increased, and the first color luminance can also be enhanced. Therefore, the luminance of a particular color can be adjusted and an electrophoretic display having high luminance and high contrast ratio (C/R) can be implemented.

Figure 13:
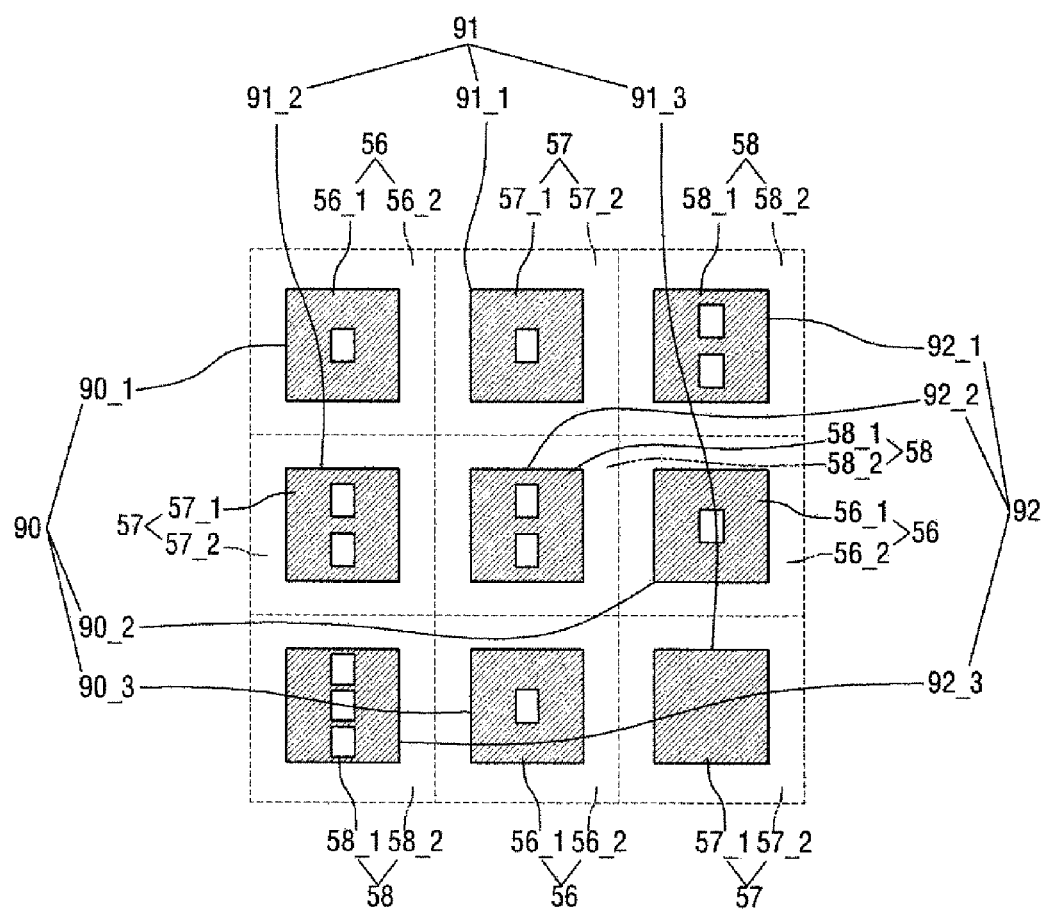
FIG. 13 is a top view of a pixel region according to another embodiment of the present invention.

FIG. 13 is a top view of a pixel region according to another embodiment of the present invention.

Referring to FIG. 13, the pixel region of the current embodiment is substantially the same as that shown in FIG. 9, except that each of first to third pixel regions 53, 54 and 55, respectively, includes a plurality of first to third unit pixel regions 56, 57 and 58, respectively, and first to third color filters 90, 91 and 92, respectively, include a plurality of first to third unit color filters 90_1, 90_2, 90_3, 91_1, 91_2, 91_3, 92_1, 92_2, and 92_3, respectively, formed in the plurality of first to third unit pixel regions 56, 57 and 58, respectively, and a repeated description will be omitted.

The first to third pixel regions 53, 54 and 55, respectively, may include the plurality of first to third unit pixel regions 56, 57 and 58, respectively. In order display a color, one pixel region may be used, as shown in FIG. 9. Alternatively, as shown in FIG. 13, in order to display a color, a plurality of unit pixel regions may be used.

The first to third color filters 90, 91 and 92, respectively, may include the plurality of first to third unit color filters 90_1, 90_2, 90_3, 91_1, 91_2, 91_3, 92_1, 92_2 and 92_3, respectively, formed in the plurality of first to third unit pixel regions 56, 57 and 58, respectively. In the respective unit pixel regions 56, 57 and 58 where the first to third unit color filters 90_1, 90_2, 90_3, 91_1, 91_2, 91_3, 92_1, 92_2 and 92_3, respectively, are formed, the first to third unit color filters 90_1, 90_2, 90_3, 91_1, 91_2, 91_3, 92_1, 92_2 and 92_3, respectively, may be formed on first regions 56_1, 57_1 and 58_1, respectively, of the unit pixel regions 56, 57 and 58, respectively.

Holes may be formed on at least one of the first to third unit color filters 90_1, 90_2, 90_3, 91_1, 91_2, 91_3, 92_1, 92_2 and 92_3, respectively. Color or luminance can be controlled in various manners by adjusting the number or sizes of holes formed in the first to third unit color filters 90_1, 90_2, 90_3, 91_1, 91_2, 91_3, 92_1, 92_2 and 92_3, respectively.

Figure 14:
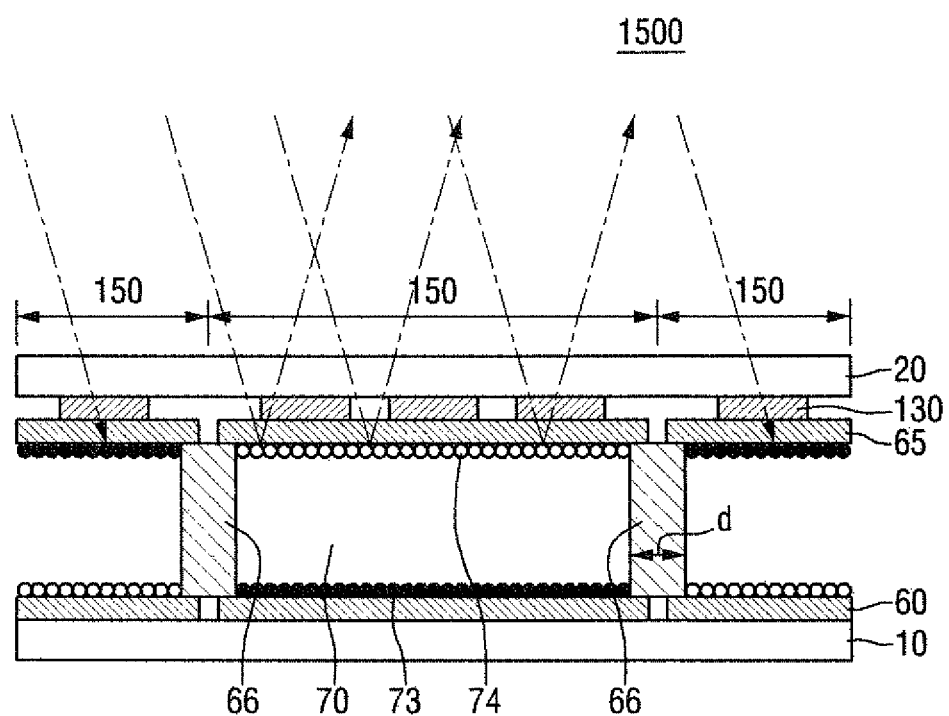
FIG. 14 is a cross-sectional view of a display apparatus according to another embodiment of the present invention.
Figure 15:
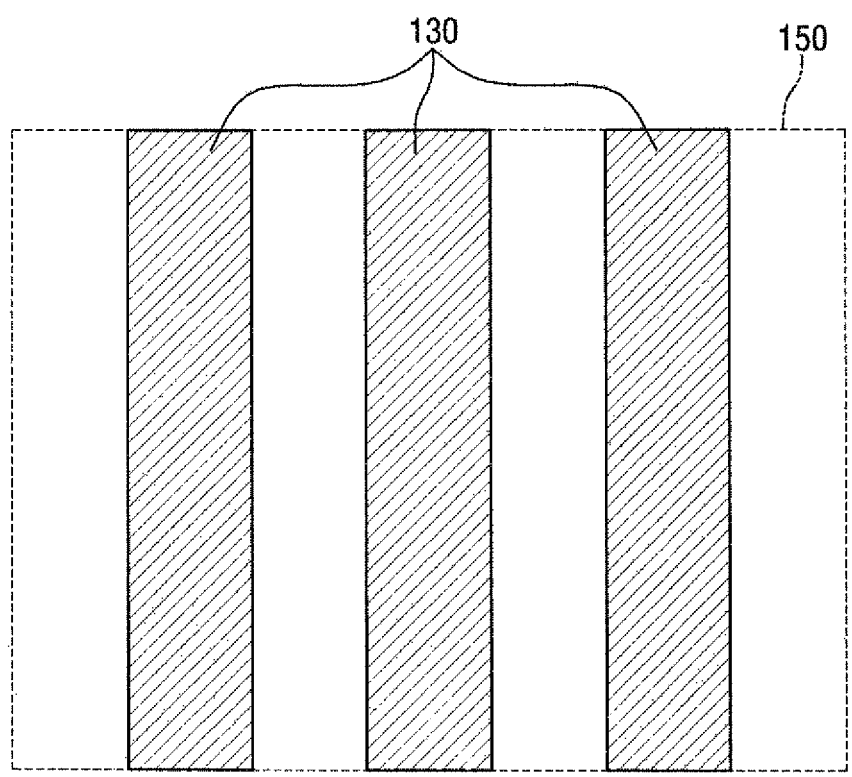
FIG. 15 is a top view of a pixel region shown in FIG. 14.
Figure 16:
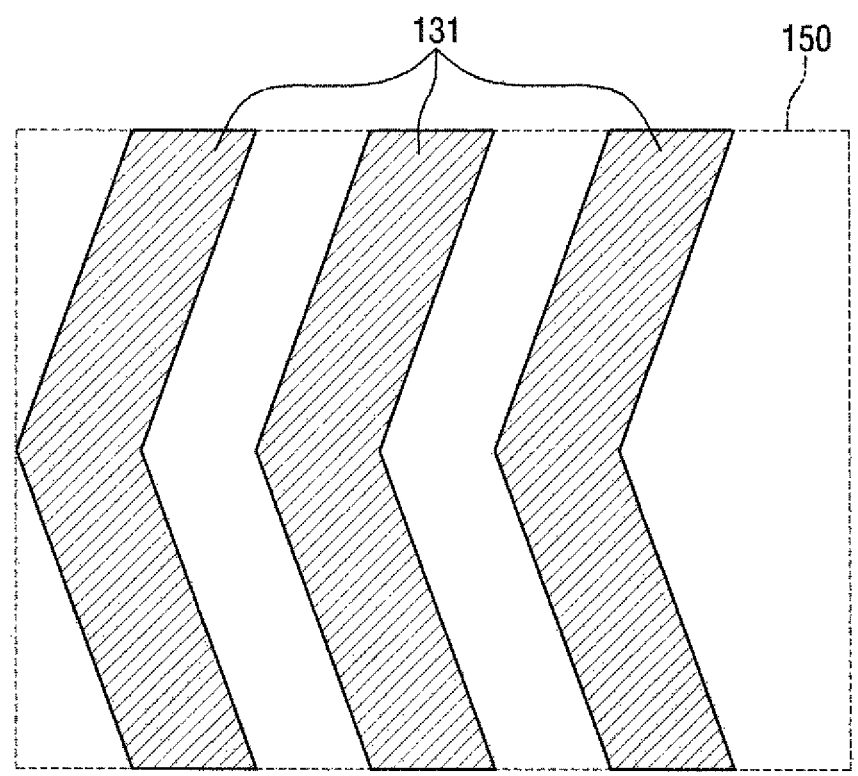
FIGS. 16 through 20 are top views of pixel regions according to various embodiments of the present invention.

FIG. 14 is a cross-sectional view of a display apparatus according to another embodiment of the present invention, FIG. 15 is a top view of a pixel region shown in FIG. 14, and FIG. 16 is a top view of a pixel region according to another embodiment of the present invention.

Referring to FIG. 14, the display apparatus of the current embodiment is substantially the same as that shown in FIG. 3, except that a color filter formed on a pixel region of an upper substrate 20 include a plurality of sub color filters 130 spaced apart from each other, and a repeated description will be omitted.

The plurality of sub color filters 130 are spaced apart from each other. Therefore, a space of one surface of the upper substrate 20, where the sub color filters 130 are not formed, may expose the one surface of the upper substrate 20. In some embodiments, although not shown, in order to planarize the color filter 130 upper substrate 20, a coating layer may be formed in the space where the sub color filters 130 are not formed.

FIG. 14 illustrates three types of light beams incident into the central pixel region. First, the incident light shown in the right side passes through the color filter 130 one time until reaching the white charged particles 74, and passes through the color filter 130 one more time when being reflected at the white charged particles 74. Thus, the reflected light corresponding to approximately 9% of the incident light can only be viewed.

However, the incident light shown in the left side passes through the color filter 130 until reaching the white charged particles 74, but does not pass through the color filter 130 when being reflected at the white charged particles 74. Thus, the reflected light corresponding to approximately 30% of the incident light can be viewed.

Next, the incident light shown in the center does not pass through the color filter 30 when reaching and being reflected from the white charged particles 74. Thus, the reflected light corresponding to 100% of the incident light can be viewed.

Users can view all of the reflected light for the three incident light beams. Since the luminance of the color viewed by the users is an average of luminance levels of the three reflected light beams, the users can view a color having higher luminance than in the case where all of the incident light beams pass through a color filter two times.

Therefore, the color and luminance of light can be controlled in various manners, and an electrophoretic display having high luminance and high contrast ratio (C/R) can be implemented.

Referring to FIGS. 15 and 16, a color filter is formed on a pixel region 150 of an upper substrate, and the color filter may include a plurality of sub color filters 130 and 131 spaced apart from each other. As shown in FIG. 15, the sub color filters 130 may be shaped of bars. As shown in FIG. 16, the sub color filters 131 may be bent. For the sake of convenient explanation, FIGS. 15 and 16 illustrate the plurality of sub color filters have the same shape. Alternatively, the plurality of sub color filters may have different shapes.

Figure 17:
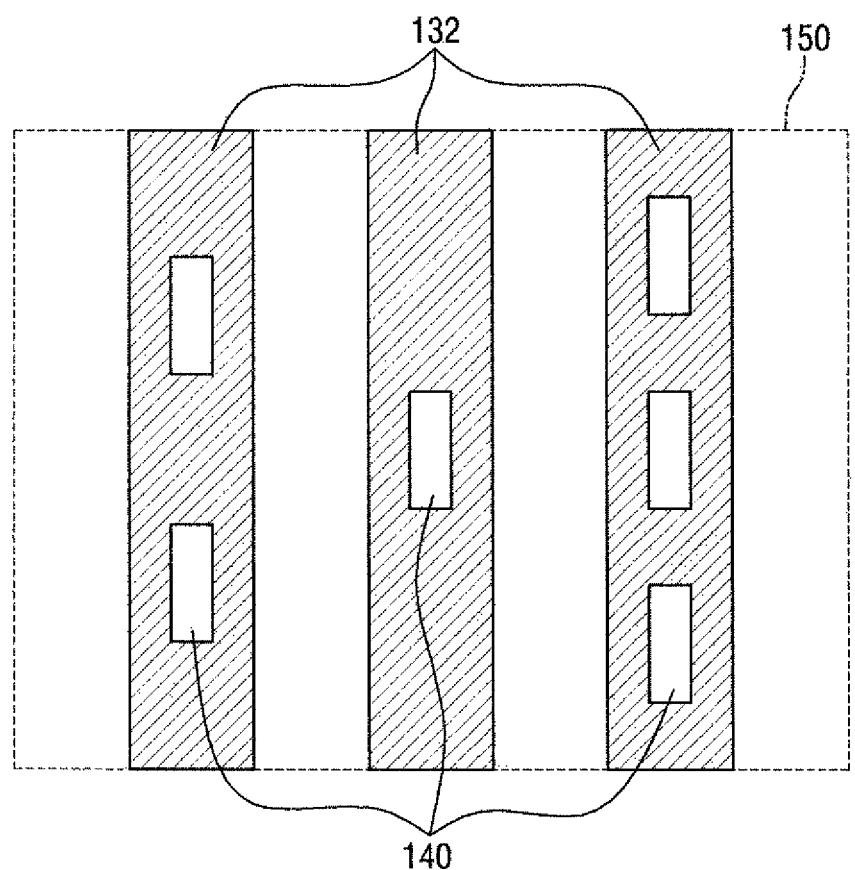

FIG. 17 is a top view of a pixel region according to another embodiment of the present invention.

Referring to FIG. 17, the pixel region 150 of the current embodiment is substantially the same as that shown in FIG. 15, except that one or more holes 140 are formed in each of a plurality of sub color filters 132, and a repeated description will be omitted.

Figure 18:
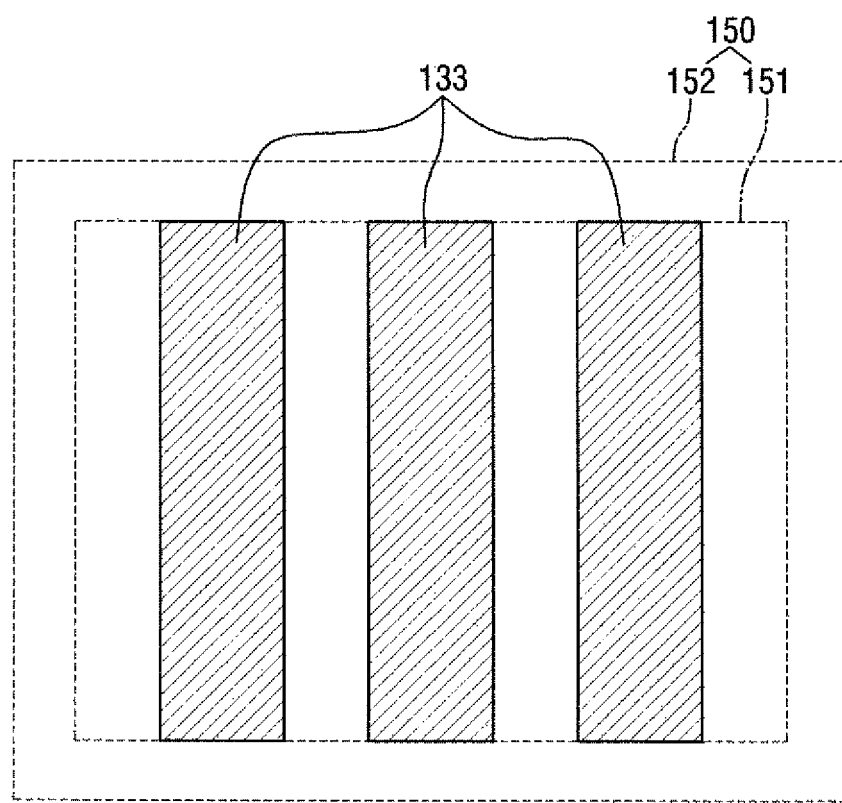
Figure 19:
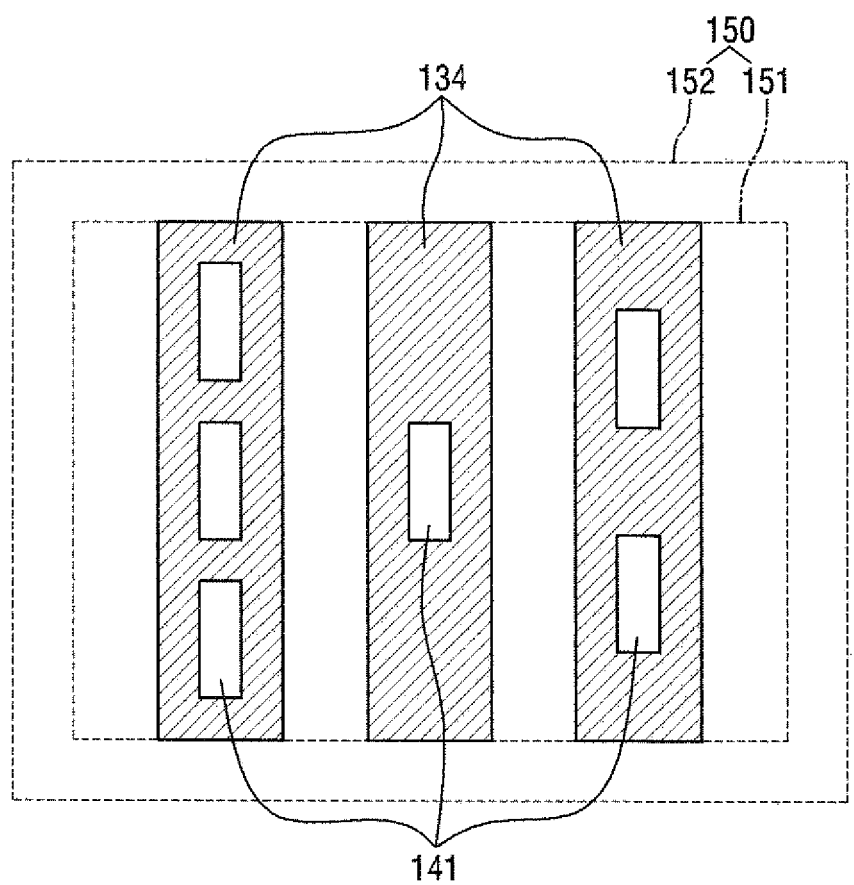

FIGS. 18 and 19 are top views of pixel regions according to various embodiments of the present invention.

Referring to FIG. 18, the pixel region 150 of the current embodiment is substantially the same as that shown in FIG. 15, except that the pixel region 150 includes a first region 151 and a second region 152 surrounding the first region 151, and color filters 133 are formed on the first region 151, and a repeated description will be omitted.

An area of the first region 151 may be approximately 75 to 85% that of the pixel region 150. In addition, the area of the first region 151 may not exceed approximately 80% that of pixel region 150. As described above, an amount of light passing through the holes or the second region can be adjusted by adjusting an area ratio of color filters formed on the pixel region 150, and the luminance can be controlled, thereby implementing an electrophoretic display having high luminance and high C/R.

The color filters 133 are not formed on the second region 151 and may contact partition walls 66 disposed between a lower substrate and an upper substrate. As described above, the second region 151 in which the partition walls 66 are formed is used in the pixel region 150, which may increase a bonding margin, thereby suppressing misalignment of the upper substrate and the lower substrate, thereby preventing color mixing and enhancing color purity.

FIG. 19 is a top view of a pixel region according to another embodiment of the present invention.

Referring to FIG. 19, the pixel region of the current embodiment is substantially the same as that shown in FIG. 18 except that one or more holes 141 are formed in each of a plurality of sub color filters 134. A repeated description will be omitted.

Figure 20:
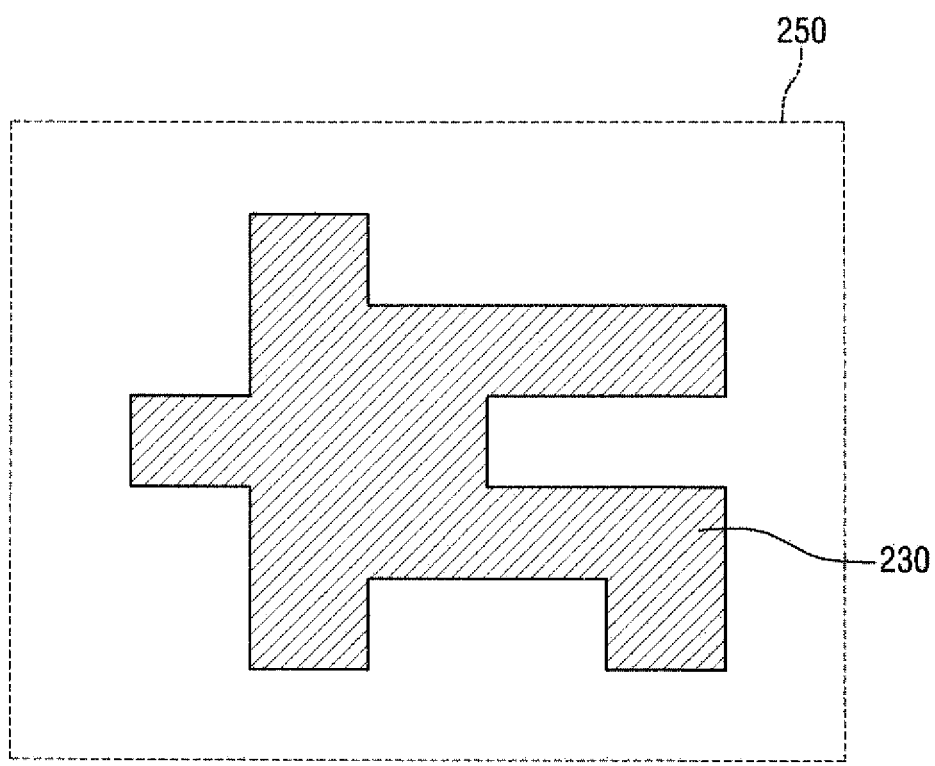
Figure 21:
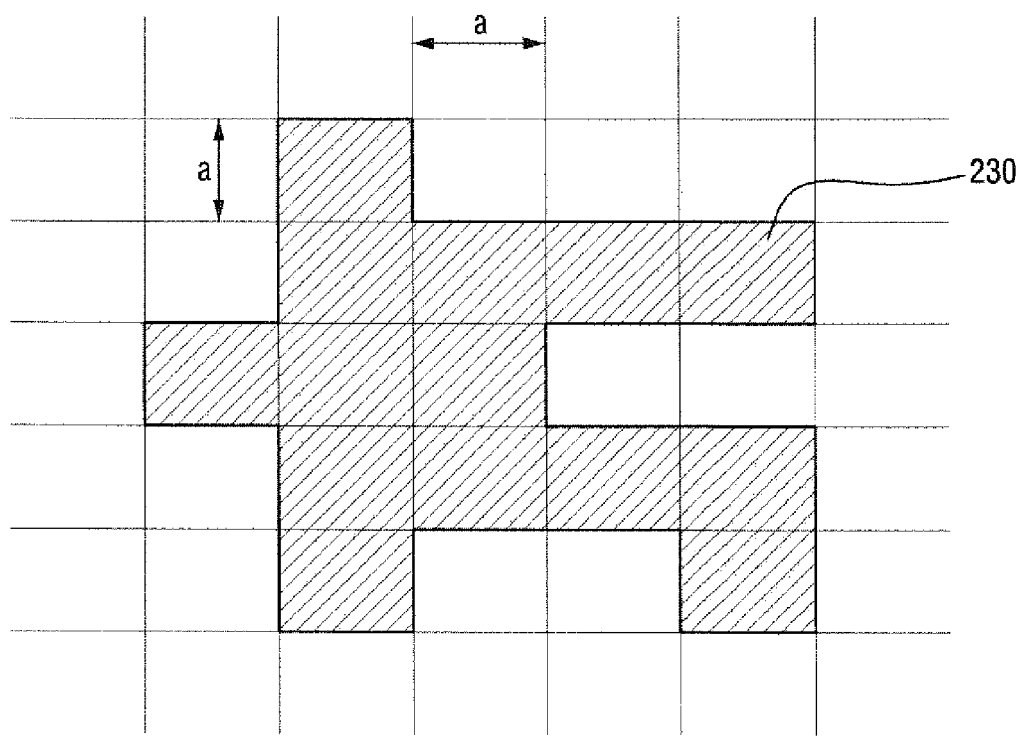
FIG. 21 is an enlarged top view of a color filter shown in FIG. 20.

FIG. 20 is a top view of a pixel region according to another embodiment of the present invention, and FIG. 21 is an enlarged top view of a color filter shown in FIG. 20.

Referring to FIG. 20, a color filter 230 is formed on a pixel region 250 of an upper substrate. Here, assuming L is a circumference of the color filter 230 on one surface of the upper substrate having the color filter 230 and A is an area of the color filter 230, $L^2/A$ is greater than 16.

FIG. 21 is an enlarged top view of a color filter 230 shown in FIG. 20. Assuming that a is a length of a side of the graph paper shown in FIG. 21, the circumference of the color filter 230 is 26 a and the area of the color filter 230 is 14 $a^2$. In the color filter 230 shown in FIGS. 20 and 21, $L^2/A=48$, which is greater than 16. In some embodiments, $L^2/A$ may be greater than 21.

Figure 22:
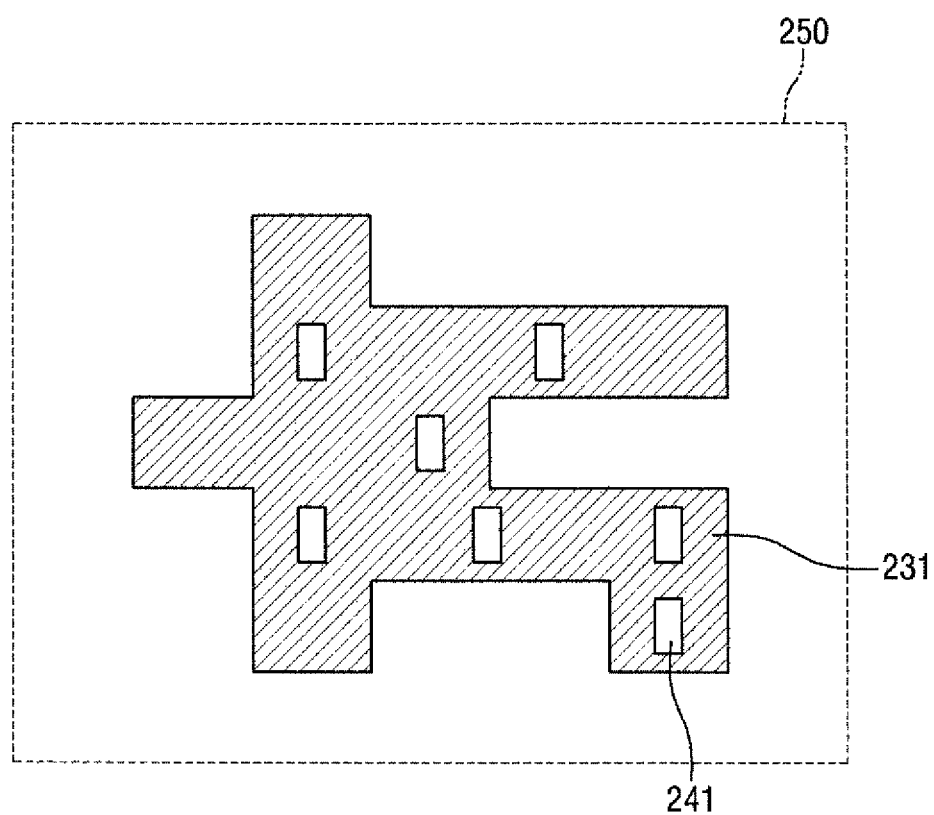
FIGS. 22 and 23 are top views of pixel regions according to various embodiments of the present invention.
Figure 23:
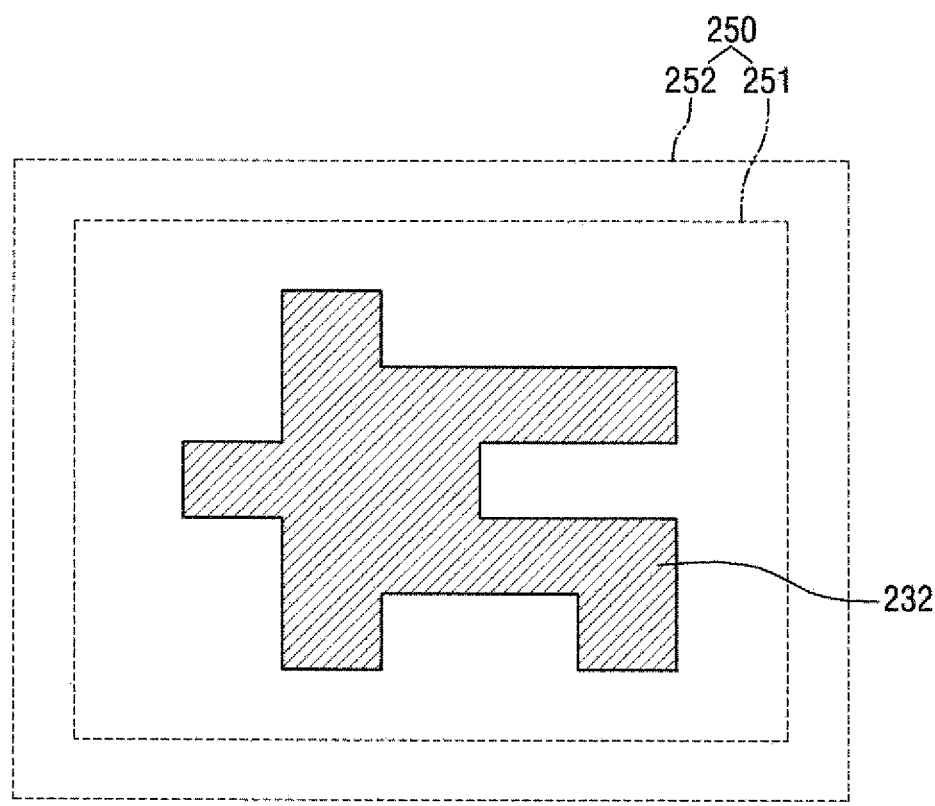

FIGS. 22 and 23 are top views of pixel regions according to various embodiments of the present invention.

Referring to FIG. 22, the pixel region 250 of the current embodiment is substantially the same as that shown in FIG. 20, except that one or more holes 241 are formed in a color filter 231, and a repeated description will be omitted.

Referring to FIG. 23, the pixel region 250 of the current embodiment is substantially the same as that shown in FIG. 20 except that it includes a first region 251 and a second region 252 surrounding the first region 251, and a color filter 232 is formed on the first region 251. A repeated description will be omitted.

While the present invention has been particularly shown and described with reference to exemplary embodiments thereof, it will be understood by those of ordinary skill in the art that various changes in form and detail may be made therein without departing from the spirit and scope of the present invention as defined by the following claims. Therefore, it is desired that the present embodiments be considered in all respects as illustrative and not restrictive, reference being made to the appended claims rather than the foregoing description to indicate the scope of the invention.

What is claimed is:

1. A display apparatus, comprising:
a first substrate;
a second substrate disposed on the first substrate so as to face the first substrate and having a plurality of pixel regions defined therein; and
a plurality of color filters formed on the plurality of pixel regions of the second substrate, each color filter having at least one hole formed therein;
wherein the plurality of pixel regions include a first pixel region, a second pixel region, and a third pixel region, and the plurality of color filters includes first to third color filters formed on the first to third pixel regions, respectively, and said at least one hole is formed in at least one of the first to third color filters;
said apparatus further comprising partition walls disposed between the first substrate and the second substrate, each of the first to third pixel regions includes a first region and a second region surrounding the first region, the first to third color filters are formed on the first regions of the first to third pixel regions, respectively, and the partition walls contact the second substrate at the second region of each of the first to third pixel regions.

2. The display apparatus of claim 1, wherein the first pixel region displays a first color, the second pixel region displays a second color, and the third pixel region displays a third color.

3. The display apparatus of claim 1, wherein the first to third pixel regions include a plurality of first to third unit pixel regions, respectively, the first to third color filters include a plurality of first to third unit color filters, respectively, formed on the plurality of first to third unit pixel regions, respectively, and said at least one hole is formed on at least one of the plurality of first to third unit color filters.

4. The display apparatus of claim 1, further comprising:
a first electrode formed on the first substrate;
a second electrode formed on the second substrate; and
an electrophoretic layer formed between the first substrate and the second substrate,
the electrophoretic layer including colored charged particles dispersed in the electrophoretic layer.

5. The display apparatus of claim 4, wherein the colored charged particles include white charged particles and black charged particles, and the white charged particles and the black charged particles have different polarities.

6. The display apparatus of claim 4, further comprising a third electrode formed on the first substrate.

7. The display apparatus of claim 6, further comprising a black matrix formed on the first substrate, wherein the colored charged particles are white charged particles.

8. The display apparatus of claim 6, further comprising a reflection layer disposed on the first substrate.

9. A display apparatus, comprising:
a first substrate;
a second substrate disposed on the first substrate so as to face the first substrate and having a plurality of pixel regions defined therein; and
a plurality of color filters formed on the plurality of pixel regions of the second substrate, each color filter having at least one hole formed therein;
wherein an area of the color filters is approximately 80% of an area of the plurality of pixel regions.

10. A display apparatus of claim 1, comprising:
a first substrate;
a second substrate disposed on the first substrate so as to face the first substrate and having a plurality of pixel regions defined therein; and
a plurality of color filters formed on the plurality of pixel regions of the second substrate, each color filter having at least one hole formed therein;
wherein each of the pixel regions includes a first region and a second region, and an area of the first regions is approximately 80% of an area of the plurality of pixel regions.

11. A display apparatus, comprising:
a first substrate;
a second substrate disposed on the first substrate so as to face the first substrate and having a plurality of pixel regions defined therein; and
a plurality of color filters formed on the plurality of pixel regions of the second substrate;
wherein the plurality of pixel regions include a first pixel region, a second pixel region, and a third pixel region, the plurality of color filters include a plurality of sub color filters formed on the pixel regions and spaced apart from each other, respectively, and at least one hole is formed in at least one of the first to third color filters;
said apparatus further comprising partition walls disposed between the first substrate and the second substrate, each of the first to third pixel regions includes a first region and a second region surrounding the first region, the first to third color filters are formed on the first regions of the first to third pixel regions, respectively, and the partition walls contact the second substrate at the second region of each of the first to third pixel regions.

12. The display apparatus of claim 11, wherein an area of the first regions is approximately 80% of an area of the plurality of pixel regions.

13. The display apparatus of claim 11, wherein each of the plurality of sub color filters includes at least one hole.

14. The display apparatus of claim 11, further comprising:
a first electrode formed on the first substrate;
a second electrode formed on the second substrate; and an electrophoretic layer formed between the first substrate and the second substrate, the electrophoretic layer colored charged particles dispersed in the electrophoretic layer.

15. A display apparatus comprising:
a first substrate;
a second substrate disposed on the first substrate so as to face the first substrate and having a plurality of pixel regions defined therein; and
a plurality of color filters formed on the plurality of pixel regions of the second substrate, the color filters including a plurality of sub color filters spaced apart from each other;
wherein a total area of the plurality of sub color filters is approximately 80% of an area of the plurality of pixel regions.

16. A display apparatus, comprising:
a first substrate;
a second substrate disposed on the first substrate so as to face the first substrate and having a plurality of pixel regions defined therein; and
a color filter formed on the plurality of pixel regions of the second substrate;
wherein, assuming L is a circumference of the color filter on one surface of the second substrate having the color filter and A is an area of the color filter, L2/A is greater than 16.

17. The display apparatus of claim 16, wherein an area of the color filters is approximately 80% of an area of plurality of pixel regions.

18. The display apparatus of claim 17, wherein each of the plurality of pixel regions includes a first region and a second region surrounding the first region, and the color filters are formed on the first region.

19. The display apparatus of claim 18, further comprising partition walls disposed between the first substrate and the second substrate, wherein the partition walls contact the second substrate at the second region of the second substrate.

20. The display apparatus of claim 18, wherein an area of the first regions is approximately 80% of an area of the plurality of pixel regions.

21. The display apparatus of claim 16, wherein each of the plurality of sub color filters includes at least one hole.

22. The display apparatus of claim 16, further comprising:
a first electrode formed on the first substrate;
a second electrode formed on the second substrate; and
an electrophoretic layer formed between the first substrate and the second substrate, the electrophoretic layer including colored charged particles dispersed in the electrophoretic layer.

* * * * *